United States Patent
Humlicek (10) Patent No.: US 6,751,750 B1
(45) Date of Patent: Jun. 15, 2004

(54) METHOD TO PROTECT AND RECOVER A WRITE AHEAD LOG FROM INTERRUPTIONS

(75) Inventor: Donald R. Humlicek, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 446 days.

(21) Appl. No.: 09/872,643

(22) Filed: Jun. 1, 2001

(51) Int. Cl.[7] .................. G06F 11/00; G06F 9/44; G06F 12/00
(52) U.S. Cl. ............... 714/20; 714/6; 714/16; 717/201; 711/112; 711/161; 711/162
(58) Field of Search .............. 714/6, 16, 20; 707/201, 202, 203, 204; 711/112, 161, 162

(56) References Cited

U.S. PATENT DOCUMENTS

| | | | | |
|---|---|---|---|---|
| 5,333,303 A | * | 7/1994 | Mohan | 714/20 |
| 5,452,430 A | * | 9/1995 | Dievendorff et al. | 714/37 |
| 6,185,699 B1 | * | 2/2001 | Haderle et al. | 714/19 |
| 6,298,425 B1 | * | 10/2001 | Whitaker et al. | 711/162 |
| 6,324,654 B1 | * | 11/2001 | Wahl et al. | 714/6 |
| 6,629,198 B2 | * | 9/2003 | Howard et al. | 711/112 |

* cited by examiner

*Primary Examiner*—Robert Beausoliel
*Assistant Examiner*—Emerson Puente
(74) *Attorney, Agent, or Firm*—Suiter West PC LLO (57) ABSTRACT

The present invention is directed to a method of recovering a write ahead log after an interruption. In a first aspect of the present invention, a method of writing a log entry of a write ahead log may include initiating a log write to a write ahead log, the write ahead log having a first sector, and a second sector, wherein the first sector is followed by the second sector. A log entry including a sequence number is written to the second sector. Then, the log entry including the sequence number is written to the first sector.

18 Claims, 8 Drawing Sheets

METHOD TO PROTECT AND RECOVER A WRITE AHEAD LOG FROM INTERRUPTIONS

FIELD OF THE INVENTION

The present invention generally relates to the field of database transactions, and particularly to recovery of a write ahead log after an interruption.

BACKGROUND OF THE INVENTION

The efficient and persistent storage of electronic data is of the utmost importance in most every aspect of modem life. There are a variety of ways, which may be utilized to improve data storage efficiency. For example, a client may start a transaction, a database is updated and committed to disk, and the transaction completed. The client is then free to perform another transaction. The database prevents other clients from performing transactions that would also update shared areas in the database until the first client's transaction completes. This limits concurrency by forcing transactions to be single threaded.

To improve performance, a database may perform multiple transactions in batches. Multiple transactions that update the database may start, but should not complete until all changes to the database have been made and the database committed to disk. At some point, new transaction may be put on hold and not allowed to start so that an earlier transaction may have a chance to complete. This is an improvement over single threaded transactions, but may still cause transactions to wait for the completion of other transactions.

A write ahead log is used to further improve performance by improving transaction concurrency to a database. A write ahead log is a sequentially written log file that contains the essence of the transaction. For example, as each transaction starts, a database is updated in memory, the essence of the transaction is written to a write ahead log and committed to disk, and the transaction completes. Thus, it does not have to wait for the database to be written to disk. The updated database in memory may be written to disk at any time after the transaction has been committed to the write ahead log. However, if the system, running the database, was interrupted by a reset or power cycle the database may have incomplete transactions. The write ahead log may then be used to rebuild the changes to the database.

One problem is that a write ahead log is typically circular, with a head and tail, and is written sequentially to disk one block at a time. Multiple transactions may be placed in each block, but is typically limited to waiting for an earlier write to complete.

A sequence number is typically maintained in each block so that after an interruption, the head and tail may be re-determined. If the write to the next log block is interrupted, then during recover, the transaction information in the log block could be old information (meaning the write never took place), new information (meaning the write completed successfully), or indeterminate information. If it is old or new, then the head and tail may be determined. If it is indeterminate information due to the interruption, then the information may be ignored, as though it had not been written. If it is indeterminate information due to some sort of data corruption after the log write completed successfully, then the log and the database must be considered invalid and unusable. Thus, a problem may be encountered in distinguishing between the last two cases.

Therefore, it would be desirable to provide a method for recovery of a write ahead log after an interruption.

SUMMARY OF THE INVENTION

Accordingly, the present invention is directed to a method of recovering a write ahead log after an interruption. In a first aspect of the present invention, a method of writing a log entry of a write ahead log includes initiating a log write to a write ahead log, the write ahead log having a first sector, and a second sector, wherein the first sector is followed by the second sector. A log entry including a sequence number is written to the second sector. Then, the log entry including the sequence number is written to the first sector.

In a second aspect of the present invention, a method of writing log entries of a write ahead log, includes initiating a log write to a write ahead log, the write ahead log having a first sector, a second sector and a third sector. The first sector is followed by the second sector and the second sector is followed by the third sector, the first sector being an initial head of the write ahead log. A log entry including a sequence number is written to the third sector. Then, the log entry including the sequence number is written to the second sector.

In a third aspect of the present invention, a data storage system, includes a data storage device suitable for storage of electronic data. The data storage device is configured to include a write ahead log, the write ahead log having a first sector, a second sector and a third sector. The first sector is followed by the second sector and the second sector is followed by the third sector, the first sector being an initial head of the write ahead log. A controller suitable for configuring the data storage system to perform a program of instructions is communicatively coupled to the data storage device. When the controller receives a request to perform a write to the write ahead log, the controller configures the data storage device to write a log entry including a sequence number to the third sector and then write the log entry including the sequence number to the second sector.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 14, exemplary embodiments of the present invention are shown. Use of a write ahead log may greatly increase the efficiency of database transactions. However, if a write to a next log block is interrupted, during recovery, the transaction information in the log block may be old data (meaning the write never took place), new data (meaning the write completed successfully), or indeterminate data. If the data is old or new, then the head and tail may be determined. If the data is indeterminate due to the interruption, then the information may be ignored, as though it had not been written. For example, the data may be ignored due to an application, which did not receive an indication that the transaction completed, and therefore, to the application, the change was never made. If the data is indeterminate due to some sort of data corruption after the log write completed successfully, and the application was indicated that the transaction completed successfully, then the log and the database must be considered invalid and unusable. Thus, a problem may be encountered in distinguishing between indeterminate data due to interruption versus data corruption after writing.

For example, an error may be tolerated in the head of the log since an interruption while writing to the new head of the log may leave it unreadable or with indeterminate data. Recovery for an interrupted write to the new head of the log that leaves it unreadable or unusable involves ignoring the error. In most instances, it is not necessary to recover those entries because the database transactions that logged those entries has not been written to disk yet, thereby allowing database transactions to be re-copied from the base volume to the repository volume when the transaction is retried. Additionally, if the write to the new head of the log succeeds, and an interruption occurs before the next write to the next new head of the log, then the new head of the log must be readable and usable, because the database transaction that logged those entries has already been reported as successful. Thus, any interrupt at that point must be recoverable.

The problem with simply writing to the new head of the log, is that if an interruption occurs and it is found during recovery that the new head of the log is unreadable or unusable, then recovery cannot distinguish between an interruption during the write or some sort of corruption after the log write and before the next log write.

Figure 1A:
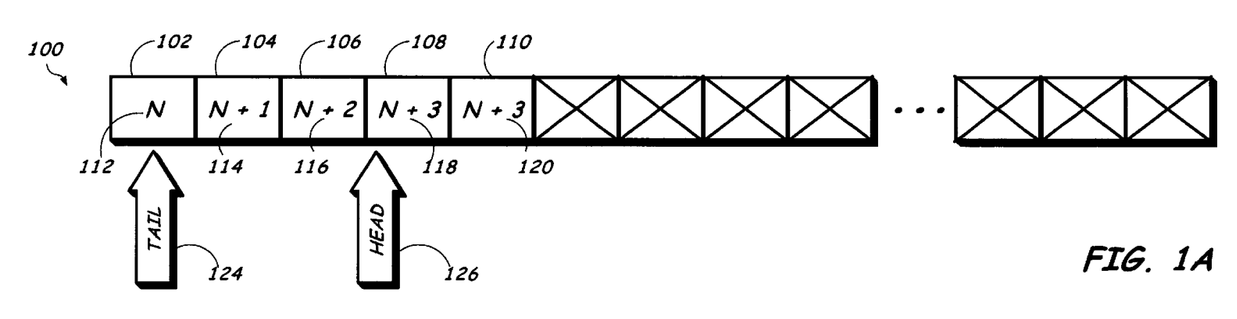
FIGS. 1A, 1B and 1C are block diagrams illustrating an exemplary embodiment of the present invention wherein two writes are performed when writing a section of log entries to a storage device.
Figure 1B:
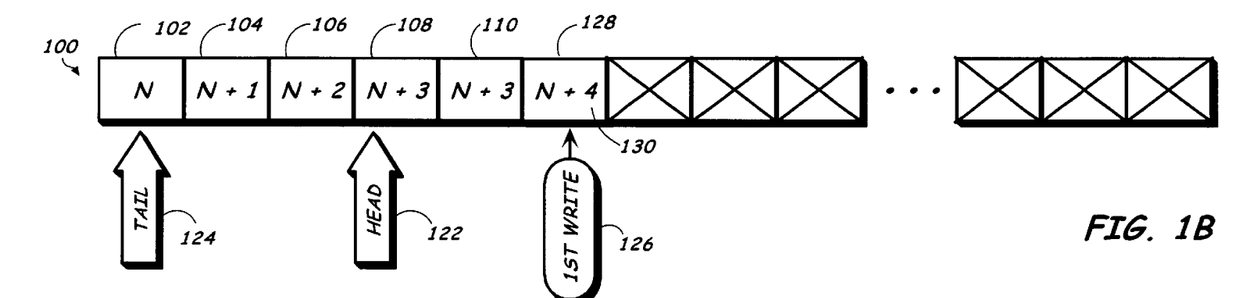
Figure 1C:
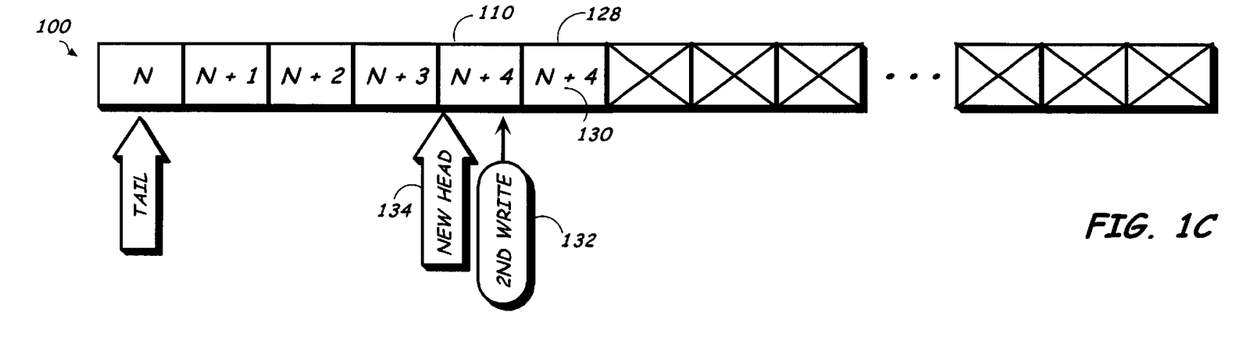

Referring now to FIGS. 1A, 1B and 1C, an exemplary embodiment of the present invention is shown wherein two writes are performed when writing a section of log entries to a storage device. In order to distinguish between these two conditions, it is preferable to perform two writes in succession instead of one write when transferring a sector of log entries to disk. Preferably, the first write is one sector past the new head of the log and the second write is to the new head of the log.

Figure 2A:
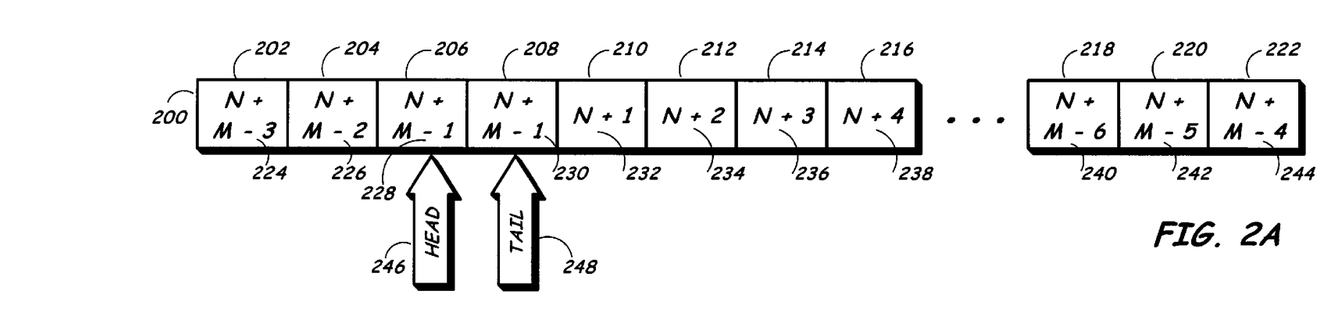
FIGS. 2A, 2B and 2C are block diagram illustrating an exemplary embodiment of the present invention wherein two writes are performed when writing a section of log entries to a write ahead log utilizing a wrap around format.
Figure 2B:
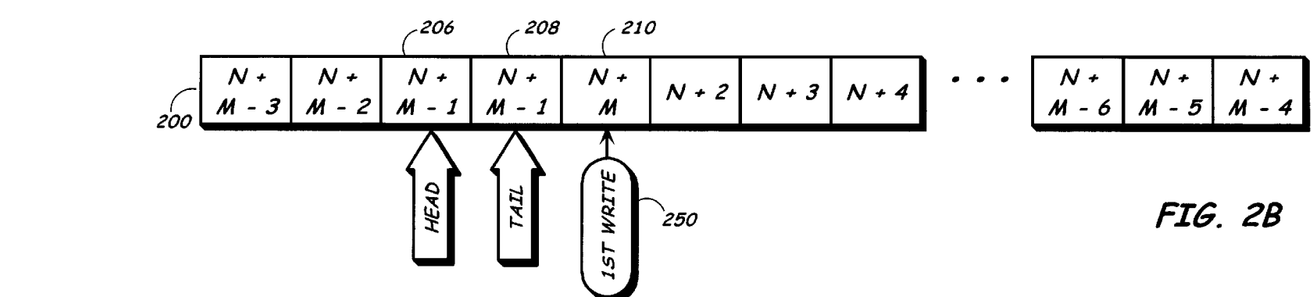
Figure 2C:
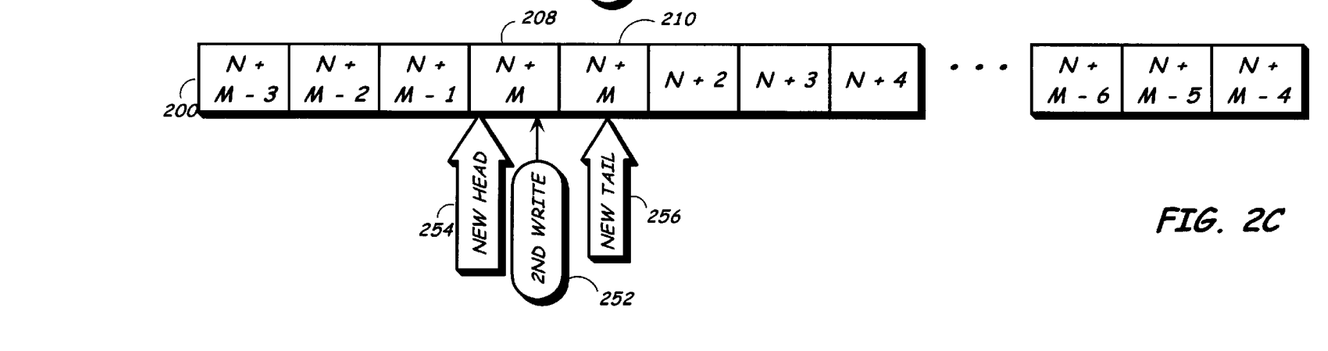

For example, a storage device 100 in FIG. 1A includes a plurality of sectors 102, 104, 106, 108 & 110 suitable for storing electronic data. Sequence numbers 112, 114, 116, 118 & 120 are included for each corresponding sector 102, 104, 106, 108 & 110 to track utilization of the sectors. A sequence number is typically maintained in each block so that after an interruption, the head and tail may be re-determined. For instance, the highest sequence number may determine the most recent entry. In this example, sequence numbers without wrap-around are shown, although it should be apparent that sequence numbers with wrap-around are also contemplated by the present invention without departing from the spirit and scope thereof, as shown in FIGS. 2A, 2B and 2C.

As shown in FIG. 1A, a head 122 is determined at sector 108 as indicated by the sequence number "N+3" 118. Additionally, the tail 124 is found at sector 102 as indicated by the sequence number "N" 112.

After the first write, which is past a new head of a log as shown in FIG. 1B, the following occurs. A first write 126 is performed in a sector 128 past a new head of a log, which in this instance includes an incremented sequence number "N+4" 130.

A second write is then performed, as shown in FIG. 1C. The second write 132 is performed at a new head 134 of the log entries written to disk. Thus, the same data is written to both blocks, such as sector 110 and 128. In this way, two writes in succession are performed when writing a block of log entries to disk. The first write is one block past a contemplated new head of the log and the second write is to the new head of the log. The advantages of this method, such as recovery and determination of head sectors, will be further discussed with regards to FIGS. 3 through 14.

Referring now to FIGS. 2A, 2B and 2C, an embodiment of the present invention is shown in which write ahead log sequence numbers with wrap around are shown. A storage device 200 having a sequence of numbers 202, 204, 206, 208, 210, 212, 214, 216, 218, 220 and 222 in corresponding sectors 224, 226, 228, 230, 232, 234, 236, 238, 240, 242 and 244 is shown. In FIG. 2A, an initial head 246 and tail 248 are shown. In FIG. 2B, a first write 250 is performed, wherein the write is performed one sector 210 past the new head, which is this instance would be sector 210. In FIG. 2C, a second write 252 is performed preceding the first sector 210, so that a new head 254 is positioned at the location, i.e. sector 208, of the second write 252. Additionally, the new tail 256 is positioned at the sector 210 at which the first write 250 (FIG. 2B) was performed. In this way, by utilizing two writes in succession instead of one when writing a block of log entries to disk, it is possible to distinguish between indeterminate information as a result of an interruption and indeterminate information due to data corruption occurring after a log write was completed successfully.

Referring generally now to FIGS. 3 through 14, exemplary methods of the present invention are shown wherein head sector are determine in a write ahead log. Although a variety of methods are discussed, it should be apparent that the methods may be reorganized, combined and modified by persons of ordinary skill in the art without departing from the spirit and scope of the present invention. To facilitate the discussion of the present invention, the initial sequence number is denoted with an "N" in the figures, while "M" is used to indicate the log size, which may be utilized in combination to indicate a sequence number. A variety of scenarios are discussed in which interruptions, error conditions and data corruption is encountered and the corresponding method of recovery for the scenario is described. Additionally, although a difference between sequence numbers is described, it should be apparent that any form and method of incrementing a sequence number as contemplated by a person of ordinary skill in the art may be utilized by the present invention without departing from the spirit and scope thereof. Further, a difference should be appreciated between the terms utilized in the present discussion, namely the use of a first sector, a second sector, a third sector and a fourth sector to describe sectors of a write ahead log as shown in the drawings, as opposed to the use of a first written sector and a second written sector, which refers to sectors written in succession in accordance with the present invention, i.e. the first written sector being the sector to which a first write is performed and a second written sector being the sector to which the second of the two writes performed in succession.

Figure 3:
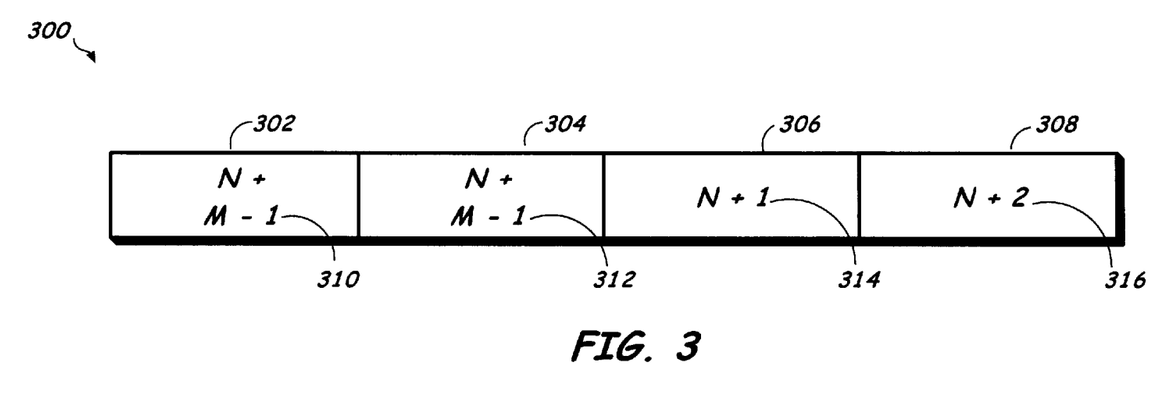
FIG. 3 is a block diagram of an embodiment of the present invention wherein a scenario including a write ahead log with wrap around encounters an interruption after a previous log write.

For example, as shown in an embodiment 300 of the present invention depicted in FIG. 3, an interruption after a previous log write is encountered and recovered. An interruption is encountered after a previous log write, or interrupted before or during a next log write. The result of such an interruption is shown in FIG. 3, wherein a first sector 302 and a second sector 304 include matching sequence numbers 310 and 312.

However, the difference between sequence number 314 of a third sector 306 and the sequence number 312 of the second sector 304 is "m−2", and the difference between the sequence number 316 of a fourth sector 308 and the sequence number 314 of the third sector 306 is one. Thus, to recover from the interruption as indicated by the sequence numbers, a head is set to the first sector 302.

Figure 4:
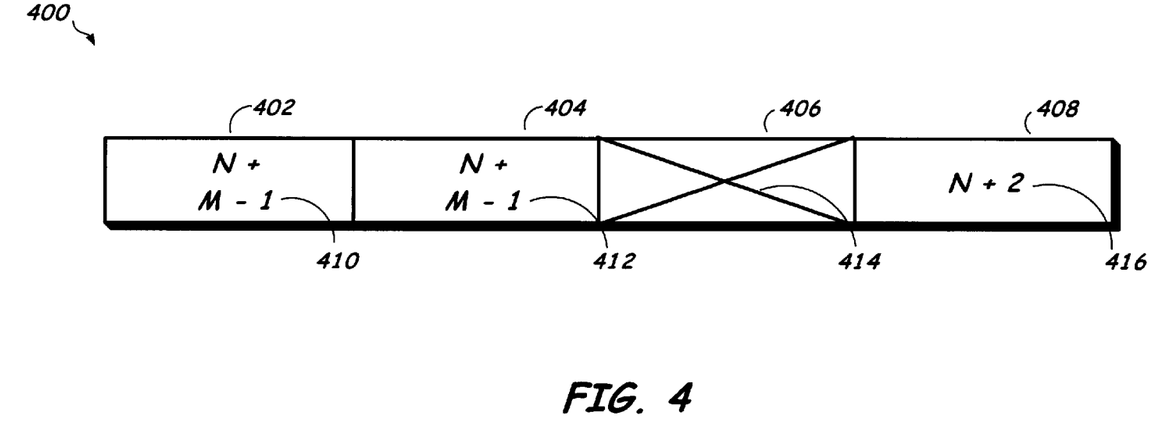
FIG. 4 is a block diagram of an embodiment of the present invention wherein a scenario including a write ahead log with wrap around experiences an interruption during a next log write and/or an oldest log write is corrupted.

Referring now to FIG. 4, an embodiment 400 of the present invention is shown wherein a write ahead log experiences an interruption during a next log write and/or an oldest log write is corrupted. The result of such an interruption configured the write ahead log such that a first sector 402 and a second sector 404 include matching sequence numbers 410 and 412.

Additionally, an error 414 is encountered in a third sector 406. Further, the difference between the sequence number 416 of a fourth sector 408 and the sequence number 412 of the second sector 404 is "M−3", due to the interruption and/or corruption. Thus, to recover from the interruption and/or corruption as indicated by the sequence numbers, the error in the third sector 406 is ignored and the head is set to the first sector 402.

Figure 5:
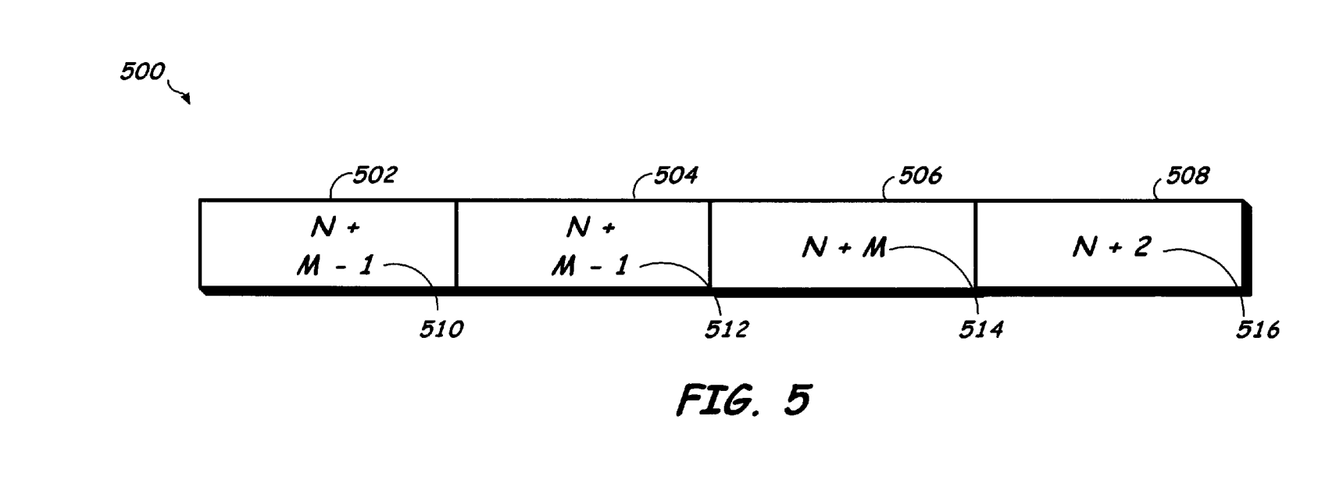
FIG. 5 is a block diagram of an embodiment of the present invention wherein a scenario including a write ahead log with wrap around encounters an interruption after a log write to a first written sector or before or during a log write to a second sector.

Additionally, an interruption may be encountered after log write to a first written sector or before or during a log write to a second sector, as shown in an embodiment 500 of the invention in FIG. 5. An interruption occurs after log write to a third sector 506, which in this case is the first written sector, or before or during a log write to a second sector 504.

Thus, the first sector 502 and the second sector 504 have matching sequence numbers 510 and 512. The difference between the sequence number 514 of the third sector 506 and the sequence number 512 of the second sector 504 is one. Further, the difference between the sequence number 516 of the fourth sector 508 and the sequence number 514 of the third sector 506 is "M−2". Therefore, to recover the write ahead log, the third sector 506 is copied to the second sector 504 and the head of the log is set to the second sector 504.

Figure 6:
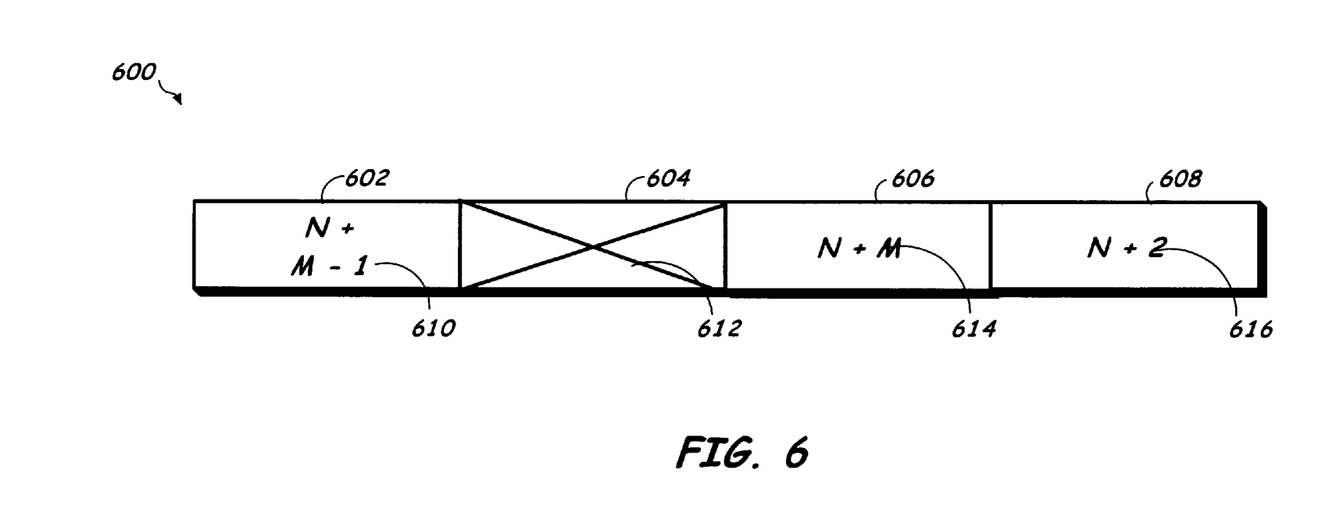
FIG. 6 is a block diagram of an embodiment of the present invention wherein a scenario including a write ahead log with wrap around encounters during a log write to a second sector, which is written after a first written sector.

Referring now to FIG. 6, an embodiment 600 of the present invention is shown wherein an interruption is encountered during a log write to a second sector, which is written after a first written sector. During a log write to a second sector 604, which in this scenario is written after a third sector 606 (i.e. the first written sector), an error occurs 612. Therefore, the difference between a sequence number 610 of a first sector 602 and a sequence number 614 of a third sector 606 is one. Additionally, the different between a sequence number 616 of a fourth sector 608 and the sequence number 614 of the third sector 606 is "M−2". Therefore, to recover the write ahead log, the third sector 606 is copied to the second sector 604 and the head is set to the second sector 604.

Figure 7:
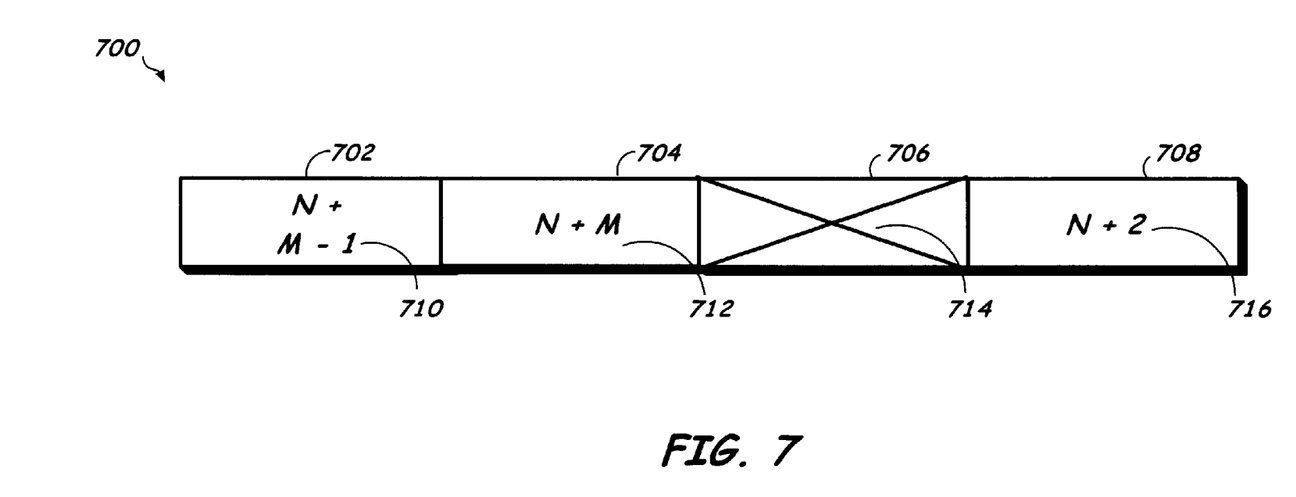
FIG. 7 is a block diagram of an embodiment of the present invention wherein a scenario including a write ahead log with wrap around encounters an interruption after a log write to a second sector with a corrupted data condition occurring in a first log written sector.

Referring now to FIG. 7, an embodiment 700 of the present invention is shown wherein an interruption has occurred after a log write to a second sector with a corrupted data condition occurring in a first log written sector. In the present example, an interruption has occurred after a log write to a second sector 704 with a corrupted data condition 714 occurring in a third sector 706, the first written sector.

Thus, the difference in sequence numbers between the sequence number 710 of the first sector 702 and the sequence number 712 of the second sector 704 is one. Additionally, the difference in sequence numbers between the sequence number 716 of a fourth sector 708 and the sequence number 712 of the second sector 704 is "M−2". Therefore, to recover the write ahead log, the second sector 704 and the sequence number 712 is copied to the third sector 706, and the head of the write ahead log is set to the second sector 704.

Figure 8:
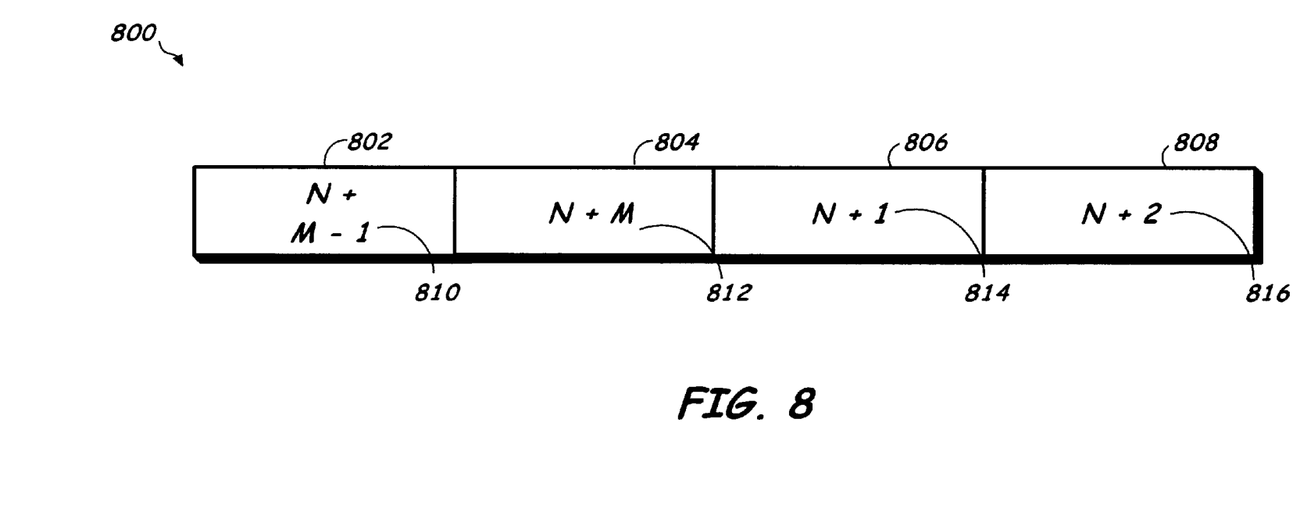
FIG. 8 is a block diagram of an embodiment of the present invention wherein a scenario including a write ahead log with wrap-around encounters an interruption after a log write to a second sector with a silent drive error occurring in a first log written sector.

Referring now to FIG. 8, an embodiment 800 of the present invention is shown wherein an interruption is encountered after a log write to a second sector with a silent drive error occurring in a first log written sector. After a log write to a second sector 804, an interruption has occurred, and further, a silent drive error has occurred in a third write sector 806, which in this instance is the first written sector.

Therefore, the difference between a sequence number 810 of a first sector 802 and the sequence number 812 of the second sector 804 is one. The difference between the sequence number 814 of the third sector 806 and the sequence number 812 of the second sector 804 is "M−1", and the difference between the sequence number 816 of the fourth sector 808 and the sequence number 814 of the third sector 806 is one. To recover the write ahead log, the second sector 804 is copied to the third sector 806 and the head is set to the second sector 804. In other words, the second written sector (the second of two writes performed in succession) is copied to the first written sector (the first of the two writes performed in succession).

Referring generally now to FIGS. 9 through 14, exemplary embodiments of the present invention are shown wherein a head sector of a write ahead log is determined in a write ahead log that does not utilize wrap-around. Although a variety of scenarios and corresponding recovery methods are discussed, the present invention contemplates a variety of write ahead log recovery scenarios without departing from the spirit and scope of the present invention.

Figure 9:
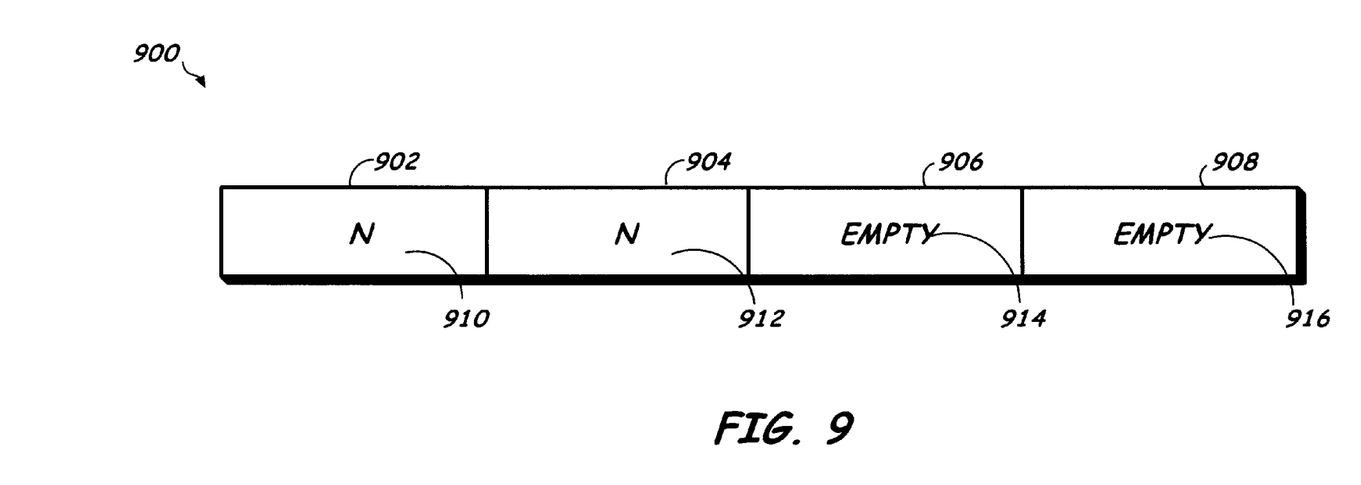
FIG. 9 is a block diagram of an embodiment of the present invention wherein a scenario including a write ahead log without wrap-around encounters an interruption after a previous log write or before or during a next log write.

For example, as shown in the embodiment 900 depicted in FIG. 9, an interruption to a write ahead log has occurred, such as after a previous log write or before or during a next log write. Such an interruption may cause a sequence number 910 of a first sector 902 to match a sequence number 912 of a second sector 904. In this example, a third sector 906 and a fourth sector 908 are empty 914 & 916. Therefore, to recover the write ahead log, the head is set to the first sector 902.

Figure 10:
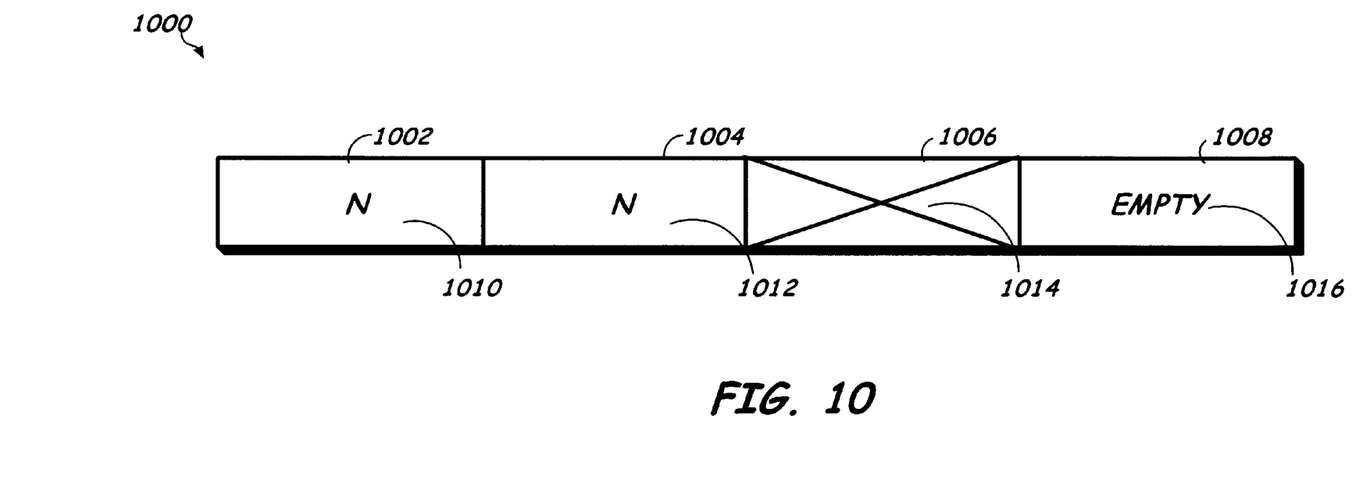
FIG. 10 is a block diagram of an embodiment of the present invention wherein a scenario including a write ahead log without wrap-around experiences an interruption during a next log write and/or a corrupted oldest log written sector.

Referring now to FIG. 10, an embodiment 1000 of the present invention is shown wherein a condition resulting from an interruption during a next log write is encountered and/or a corrupted oldest log written sector is depicted. As a result of the interruption and/or corruption, a sequence number 1010 of a first sector 1002 matches a sequence number 1012 of a second sector 1004. Additionally, a corrupted log entry 1014 of a third sector 1006 is encountered, in this instance the oldest log written sector and/or the interrupted next log written sector, and a fourth sector 1008 is empty 1016. Therefore, to recover, the corrupted log entry 1014 of the third sector 1006 is ignored and the head of the write ahead log is set to the first sector 1002.

Figure 11:
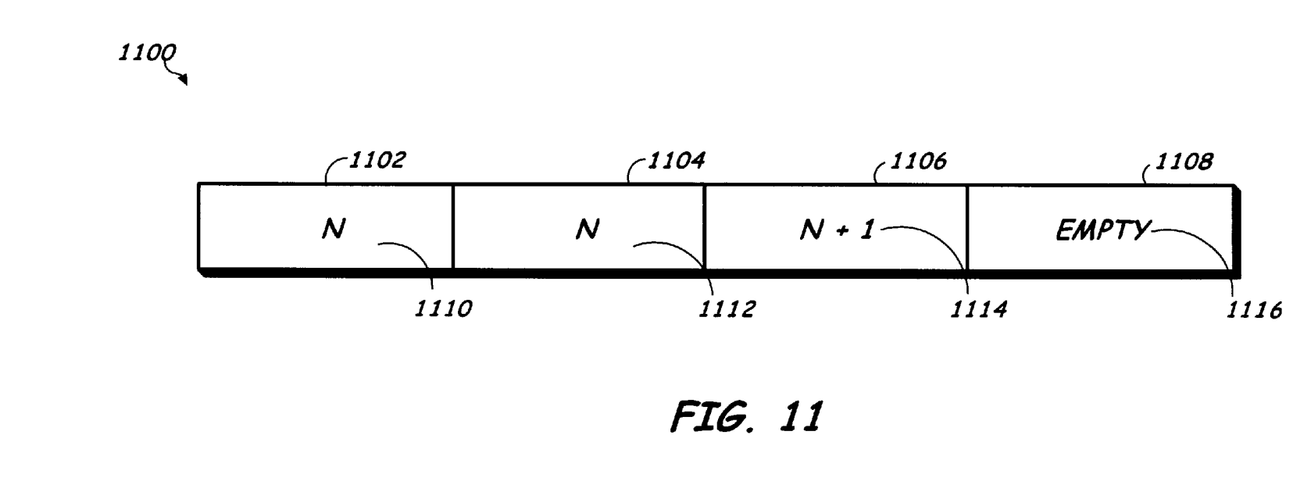
FIG. 11 is a block diagram of an embodiment of the present invention wherein a scenario including a write ahead log without wrap-around encounters an interruption after a log write to a first written sector or before or during a log write to a second written sector.

Referring now to FIG. 11, an embodiment 1100 of the present invention is shown wherein a write ahead log is interrupted after a log write to a first written sector or before or during a log write to a second written sector. In this example, an interruption is encountered after a log write to a third sector 1106, or the interruption may have occurred before or during a log write to a second sector 1104. Therefore, the sequence number 1110 of the first sector 1102 matches the sequence number 1112 of the second sector 1104. Additionally, the sequence number 1114 of the third sector 1106 is different from the sequence number 1112 of the second sector 1104 by one, and a fourth sector 1108 is empty 1116. Therefore, recovery of the write ahead log involves copying the third sector 1106 to the second sector 1104 and setting the head of the log to the second sector 1104.

Figure 12:
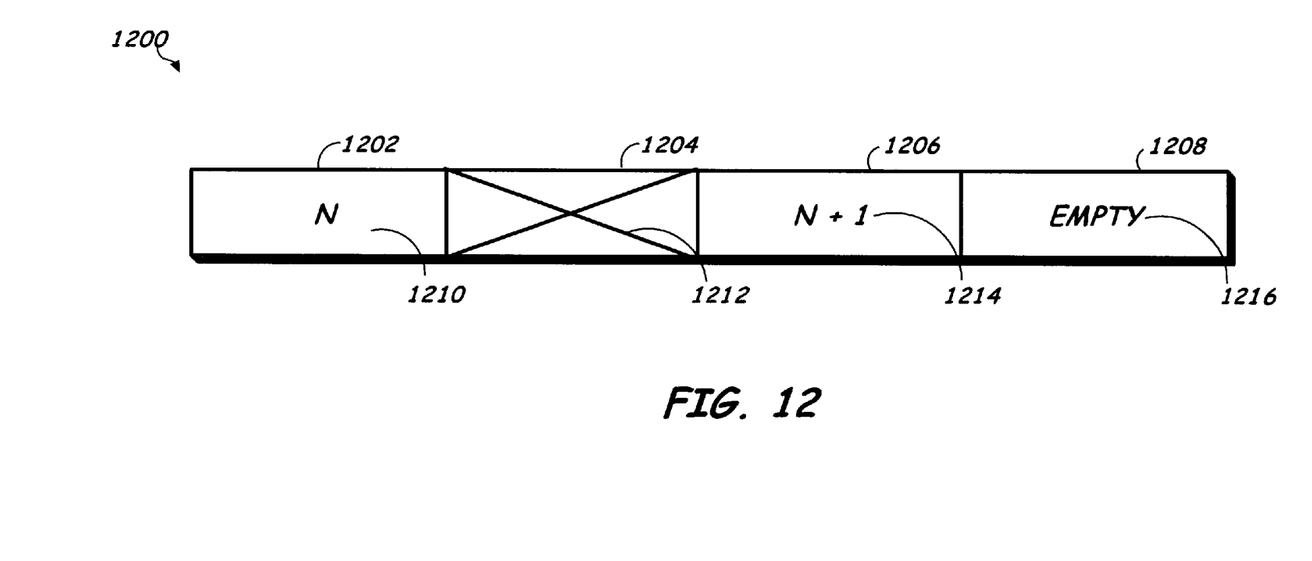
FIG. 12 is a block diagram of an embodiment of the present invention wherein a scenario including a write ahead log without wrap-around experiences an interruption during a log write to a second written sector.

In a next scenario, as shown in the embodiment 1200 depicted in FIG. 12, an interruption occurs during a log write to a second written sector, in this instance a second sector 1204. Therefore a sequence number 1214 of a third sector 1206 differs from a sequence number 1210 of a first sector 1202 by one, and a fourth sector 1208 is empty 1216. To recover the write ahead log, the third sector 1206 is copied to the second sector 1204 and the head of the write ahead log is set to the second sector 1204.

Figure 13:
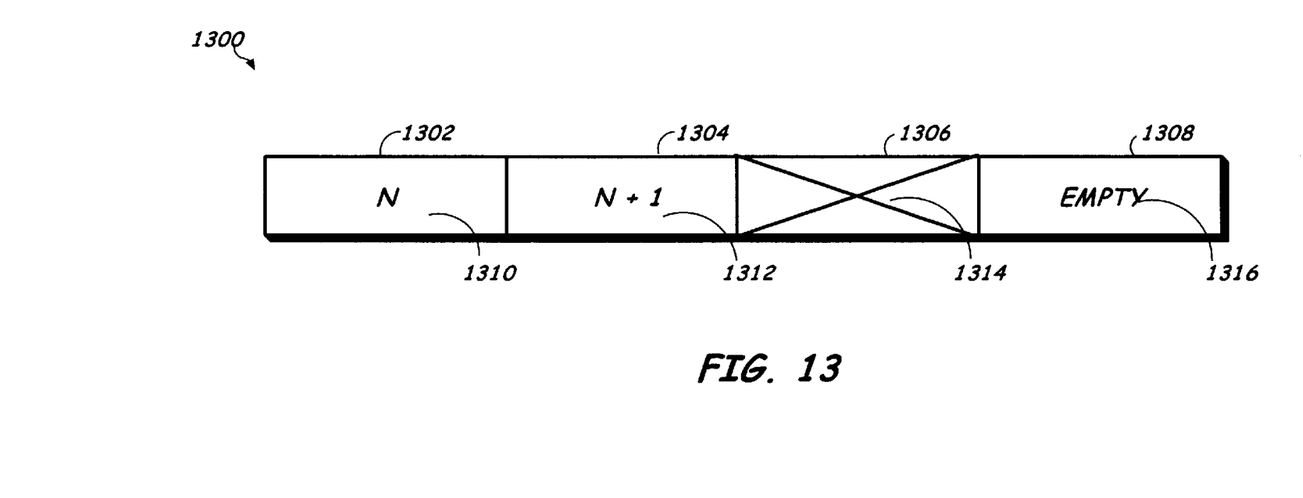
FIG. 13 is a block diagram of an embodiment of the present invention wherein a scenario including a write ahead log without wrap-around encounters an interruption occurring after a log write to a second written sector with corruption in a first log written sector.

Referring now to FIG. 13, an embodiment 1300 of the present invention is shown wherein an interruption occurring after a log write to a second written sector with corruption in a first log written sector is encountered. An interruption is encountered after a log write to a second sector 1304 with a corruption 1314 occurring in a third sector 1306, in this instance the third sector 1306 being the first written sector of the two writes performed in succession. Therefore, the sequence number 1312 of the second sector 1304 differs from the sequence number 1310 of the first sector 1302 by one, with the fourth sector 1308 being empty 1316. Therefore, to recover the write ahead log, the second sector 1304 is copied to the third sector 1306 and the head is set to the second sector 1304.

Figure 14:
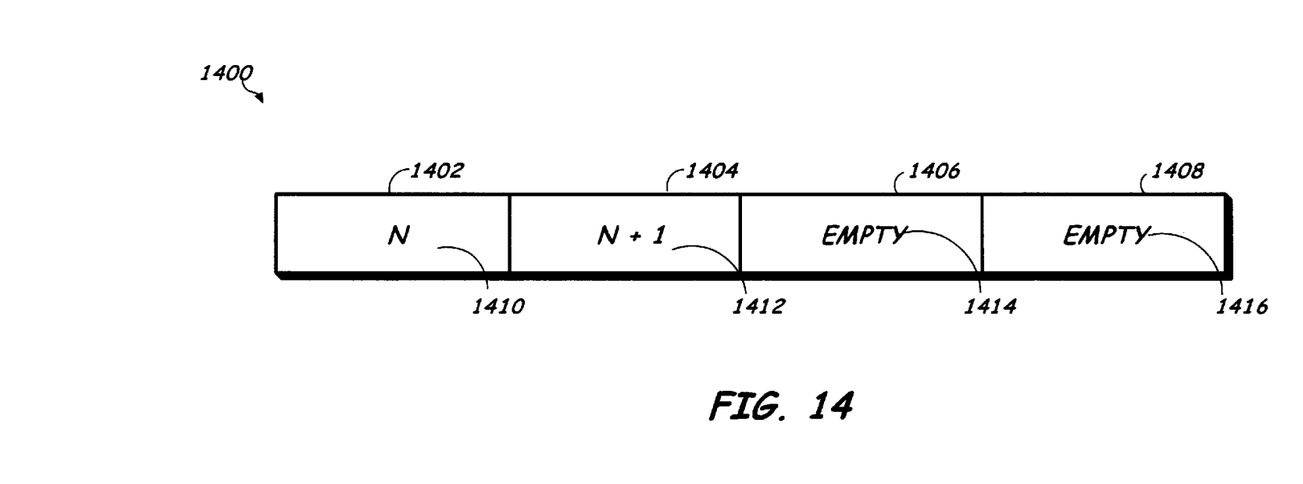
FIG. 14 is a block diagram of an embodiment of the present invention wherein a scenario including a write ahead log without wrap-around encounters an interruption after a log write to a second written sector is encountered with a silent drive error occurring in a first log written sector.

Referring now to FIG. 14, an embodiment 1400 of the present invention is shown wherein an interruption after a log write to a second written sector is encountered with a silent drive error occurring in a first log written sector. After a log write to a second sector 1404, in this instance the second written sector, an interruption is encountered, with a silent drive error occurring in a third sector 1406, the third sector 1406 being the first written sector. Thus, the sequence number 1410 of the first sector 1402 differs from the sequence number 1412 of the second sector 1404 by one, with the third sector 1406 and fourth sector 1408 being empty 1414 & 1416. Therefore, to recover the write ahead log, the second sector 1404 is copied to the third sector 1406 and the head is set to the second sector 1404.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems. Until required by the information handling system, the set of instructions may be stored in another readable memory device, for example in a hard disk drive or in a removable memory such as an optical disk for utilization in a CD-ROM drive, a floppy disk for utilization in a floppy disk drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the method to protect and recover a write ahead log of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of writing a log entry of a write ahead log, comprising:
    initiating a log write to a write ahead log, the write ahead log having a first sector, and a second sector, wherein the first sector is followed by the second sector;
    writing a log entry including a sequence number to the second sector;
    writing the log entry including the sequence number to the first sector; and
    recovering the write ahead log from an interruption, wherein the interruption includes at least one of
        after writing the log entry to the second sector with data corruption occurring in the first sector; or
        after writing the log entry to the second sector with a silent drive error occurring in the first sector;
    recovery includes copying the second sector to the first sector and setting a head of the write ahead log to the first sector.

2. The method as described in claim 1, wherein the log entry including the sequence number is written to the first sector, the first sector is a new head of the write ahead log.

3. The method as described in claim 1, further comprising determining an initial head of the write ahead log as indicated by a sequence number of a sector of the write ahead log.

4. The method as described in claim 3, wherein the initial head of the write ahead log is located in a sequence of sectors before the first sector.

5. The method as described in claim 1, wherein the interruption includes at least one of
    after writing the log entry to the first sector;
    before writing a second log entry including a second sequence number to a third sector which follows the second sector;
    during writing a second log entry including a second sequence number to a third sector which follows the second sector; or
    the third sector which follows the second sector becomes corrupted;
    recovery includes setting a head to the first sector.

6. The method as described in claim 1, wherein the interruption includes at least one of
    after writing the log entry to the second sector;
    during writing the log entry to the first sector; or
    before writing the log entry to the first sector;
    recovery includes copying the second sector to the first sector and setting a head of the write ahead log to the first sector.

7. A method of writing log entries of a write ahead log, comprising:
    initiating a log write to a write ahead log, the write ahead log having a first sector, a second sector and a third sector, wherein the first sector is followed by the second sector and the second sector is followed by the third sector, the first sector being an initial head of the write ahead log;
    writing a log entry including a sequence number to the third sector;
    writing the log entry including the sequence number to the second sector;
    recovering the write ahead log from at least one of write interruption and data corruption, wherein an interruption includes at least one of:
        after writing the log entry to the third sector with data corruption occurring in the second sector; or
        after writing the log entry to the third sector with a silent drive error occurring in the second sector;
    recovery includes copying the third sector to the second sector and setting a head of the write ahead log to the second sector.

8. The method as described in claim 7, wherein the log entry including the sequence number is written to the second sector, the second sector is a new head of the write ahead log.

9. The method as described in claim 7, further comprising determining the first sector as the initial head of the write ahead log as indicated by a sequence number of the first sector.

10. The method as described in claim 7, wherein the first sector, the second sector and the third sector are located in a sequential order.

11. The method as described in claim 7, wherein the interruption includes at least one of
    after writing the log entry to the second sector;
    before writing a second log entry including a second sequence number to a fourth sector which follows the third sector;
    during writing a second log entry including a second sequence number to a fourth sector which follows the third sector; or
    the fourth sector which follows the third sector becomes corrupted;
    recovery includes setting a head to the second sector.

12. The method as described in claim 7, wherein the interruption includes at least one of
    after writing the log entry to the third sector;
    during writing the log entry to the second sector; or
    before writing the log entry to the second sector;
    recovery includes copying the third sector to the second sector and setting a head of the write ahead log to the second sector.

13. A data storage system, comprising:
    a data storage device suitable for storage of electronic data, the data storage device configured to include a write ahead log, the write ahead log having a first sector, a second sector and a third sector, wherein the first sector is followed by the second sector and the second sector is followed by the third sector, the first sector being an initial head of the write ahead log; and
    a controller communicatively coupled to the data storage device, the controller suitable for configuring the data storage system to perform a program of instructions, wherein the controller receives a request to perform a write to the write ahead log, the controller configures the data storage device to write a log entry including a sequence number to the third sector and write the log entry including the sequence number to the second sector, wherein the controller recovers the write ahead log from an interruption, the interruption includes at least one of after writing the log entry to the third sector with data corruption occurring in the second sector; or after writing the log entry to the third sector with a silent drive error occurring in the second sector;

recovery includes copying the third sector to the second sector and setting a head of the write ahead log to the second sector.

14. The data storage system as described in claim 13, wherein the log entry including the sequence number is written to the second sector, the second sector is a new head of the write ahead log.

15. The data storage system as described in claim 13, wherein the controller determines the first sector as the initial head of the write ahead log as indicated by a sequence number of the first sector.

16. The data storage system as described in claim 13, wherein the first sector, the second sector and the third sector are located in a sequential order.

17. The data storage system as described in claim 13, wherein the interruption includes at least one of after writing the log entry to the second sector;

before writing a second log entry including a second sequence number to a fourth sector which follows the third sector;

during writing a second log entry including a second sequence number to a fourth sector which follows the third sector; or the fourth sector which follows the third sector becomes corrupted;

recovery includes setting a head to the second sector.

18. The data storage system as described in claim 13, wherein the interruption includes at least one of after writing the log entry to the third sector;

during writing the log entry to the second sector; or before writing the log entry to the second sector;

recovery includes copying the third sector to the second sector and setting a head of the write ahead log to the second sector.

* * * * *